April 20, 1943.　　　M. KNIGHT　　　2,317,276
PRESSURE APPARATUS
Filed Dec. 14, 1939　　　6 Sheets-Sheet 1

Fig. 1.

Inventor
MILTON KNIGHT.
By Frank Fraser
Attorney

April 20, 1943.　　　M. KNIGHT　　　2,317,276
PRESSURE APPARATUS
Filed Dec. 14, 1939　　　6 Sheets-Sheet 3

Inventor
MILTON KNIGHT
By Frank Fraser
Attorney

Inventor
MILTON KNIGHT.
By Frank Fraser
Attorney

Inventor
MILTON KNIGHT.
By Frank Fraser
Attorney

Patented Apr. 20, 1943

2,317,276

UNITED STATES PATENT OFFICE 2,317,276

PRESSURE APPARATUS

Milton Knight, Perrysburg, Ohio, assignor to Libbey-Owens-Ford Glass Company, Toledo, Ohio, a corporation of Ohio Application December 14, 1939, Serial No. 309,136

9 Claims. (Cl. 154—2.70)

The present invention relates broadly to pressure apparatus and more particularly to improved apparatus of this character which is especially adapted for use in the manufacture of laminated safety glass.

Generally speaking, laminated safety glass comprises two or more sheets of glass and one or more interposed plastic membranes all bonded together to form a composite structure. In order to obtain a satisfactory bond between the several laminations it is customary, after the glass and plastic layers have been assembled in proper superimposed relationship, to subject the resulting sandwich to the combined action of heat and pressure in an autoclave.

The apparatus now generally used for this purpose comprises a vessel type autoclave containing a pressing fluid and within which a group of sandwiches to be treated is placed. When loaded, the autoclave is closed and the liquid therein is heated and placed under pressure. After the heat and pressure have been maintained for a sufficient length of time to properly bond the laminations together, the liquid is cooled to reduce the temperature of the sandwiches, and finally the pressure is released to permit the autoclave to be opened.

It will be readily seen that when a vessel type autoclave is used, the pressing operation must be performed intermittently since only one group of sandwiches can be treated at the same time. Further, the liquid within the autoclave must be alternately heated and cooled and, in addition, pressure must be built up for each group of sandwiches, and this pressure subsequently exhausted before the sandwiches can be removed from the autoclave and a new group introduced.

It is an aim of the present invention to overcome these objections and to make possible an uninterrupted flow of production by the provision of an autoclave adapted to contain a fluid which is continually under pressure and within which successive sandwiches or groups of sandwiches can be subjected to the desired cycle and degree of temperatures and pressure while moving through the autoclave in a continuous or semi-continuous manner.

Another object of the invention is the provision, in an autoclave of the above character, of a novel type of lock associated with the entrance and the discharge ends thereof whereby successive sandwiches can be introduced into and subsequently discharged from the autoclave without materially affecting the temperatures or pressure of the fluid therein.

Still another object is the provision, in pressure apparatus of the above character, of means arranged within the autoclave and the locks for supporting the sandwiches and causing them to move therethrough by gravity and in a substantially continuous manner.

Further objects and advantages of the invention will become more apparent during the course of the following description when taken in connection with the accompanying drawings.

In the drawings wherein like numerals are employed to designate like parts throughout the same.

Figure 1:
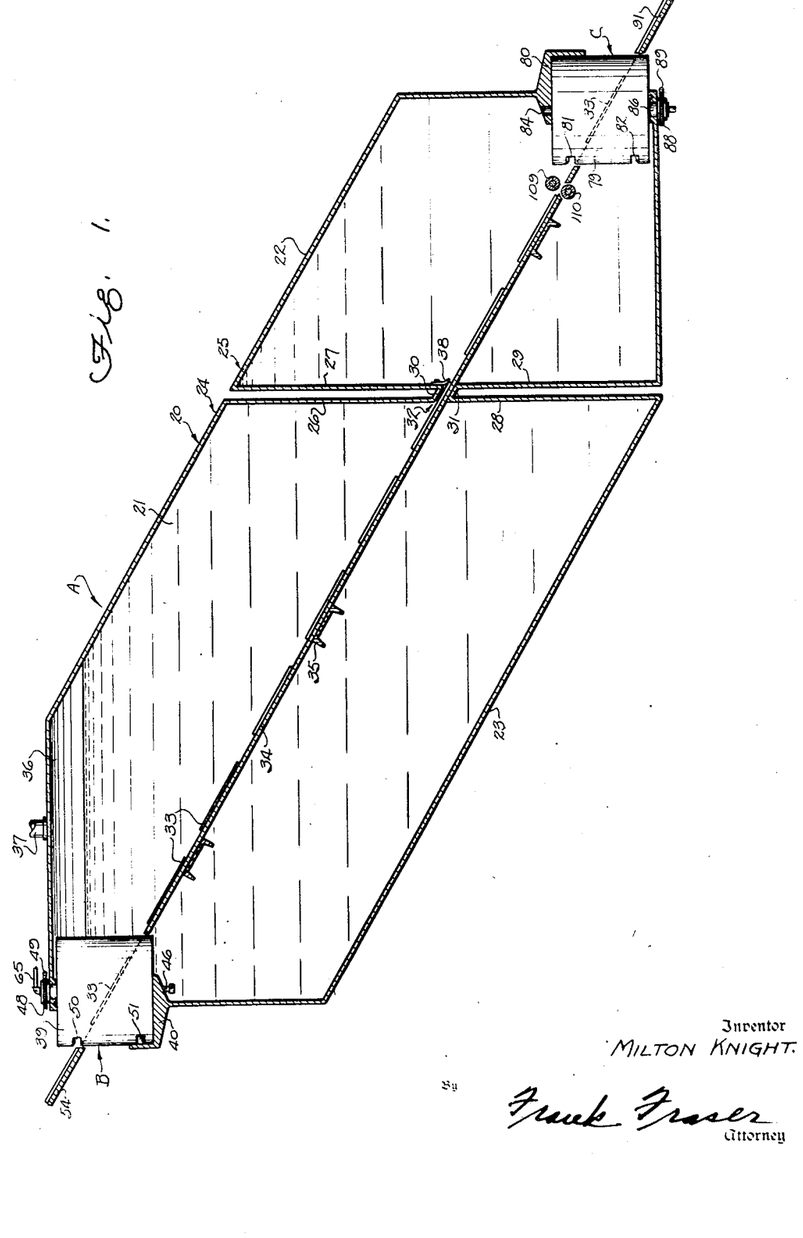
Fig. 1 is a longitudinal, vertical section through one form of apparatus embodying the invention.

Referring now more particularly to the drawings, there has been illustrated in Fig. 1 one form of pressure apparatus embodying the invention. This apparatus comprises broadly an autoclave A, through which the glass-plastic sandwiches pass during the pressing operation, and locks B and C associated with the entrance and discharge ends respectively of the autoclave. Both the autoclave A and the locks B and C are adapted to contain a liquid which may be oil, carbitol, or other suitable pressing medium. The liquid within the autoclave A will be under pressure at all times, while the pressure on the liquid within the locks B and C can be alternately built up and exhausted during operation of the locks in a manner to permit successive sandwiches to be introduced into and subsequently discharged from the autoclave A while maintaining the pressure and temperatures of the liquid therein substantially constant.

The apparatus of the present invention may be readily adapted for use with any desired cycle or degree of temperatures or pressures but, for the purpose of illustration, a construction has been shown wherein sandwiches passing through the autoclave A will first be subjected to the combined action of heat and pressure, until proper bonding of the laminations has been effected, and then cooled under pressure for a relatively shorter time before being discharged from the autoclave.

To this end, the autoclave A is in the form of a horizontally arranged, cylindrical chamber 20, containing a liquid 21, and having the upper right and lower left hand corners thereof cut down as at 22 and 23 in order to reduce the excess fluid capacity of the autoclave. The chamber 20 is divided into upper and lower communicating compartments 24 and 25 by means of spaced walls 26, 27 and 28, 29 connected at their lower and upper ends respectively by cross walls 30 and 31 to form a restricted passageway 32 between the compartments.

Sandwiches 33 to be treated may be conveyed through the autoclave A in any desired manner, but is is preferred that they be supported for movement by gravity upon a slide or the like 34, arranged within the chamber 20 at an angle to the horizontal, and extending from the entrance to the discharge end thereof. The slide 34 rests upon the cross wall 31 and is further supported upon a series of laterally extending channels 35 secured at their opposite ends to the side walls of the chamber 20.

In order to treat the sandwiches in the manner described above, as they move by gravity through the autoclave A, the liquid in both of the compartments 24 and 25 must be under pressure and this may be accomplished by introducing compressed air into the space 36, above the liquid 21 in compartment 25, through a pipe communicating therewith and connected to a suitable air compressor or the like (not shown). In addition, the liquid in the compartment 24 must be heated while the liquid in the compartment 25 is cooled. The desired temperatures may be set up and maintained in any well known manner such as by temperature control means within the compartments or by suitable liquid circulating means connected with the compartments and having temperature control means interposed in their circulating lines.

Once the proper pressure and temperature conditions have been established within the autoclave A, there will be little or no temperature exchange between the two compartments 24 and 25 because they will be insulated from each other by the air space between the walls 26, 27 and 28, 29 and also because the tendency of the heated liquid within the upper compartment 24 will be to rise while the relatively cooler liquid within the lower compartment 25 will have a tendency to fall. Temperature exchange may be further prevented by means of a curtain 38 secured at its upper edge to the wall 27 and adapted to lightly engage the slide 34, the curtain being sufficiently flexible to permit it to be moved aside by sandwiches 33 as they move through the passageway 32.

Figure 2:
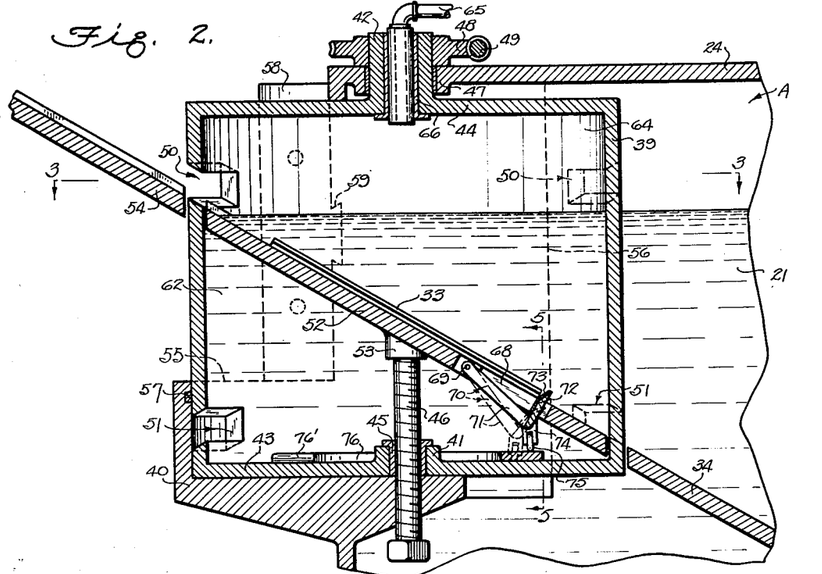
Fig. 2 is a vertical section through the lock associated with the entrance end of the autoclave in Fig. 1.
Figure 3:
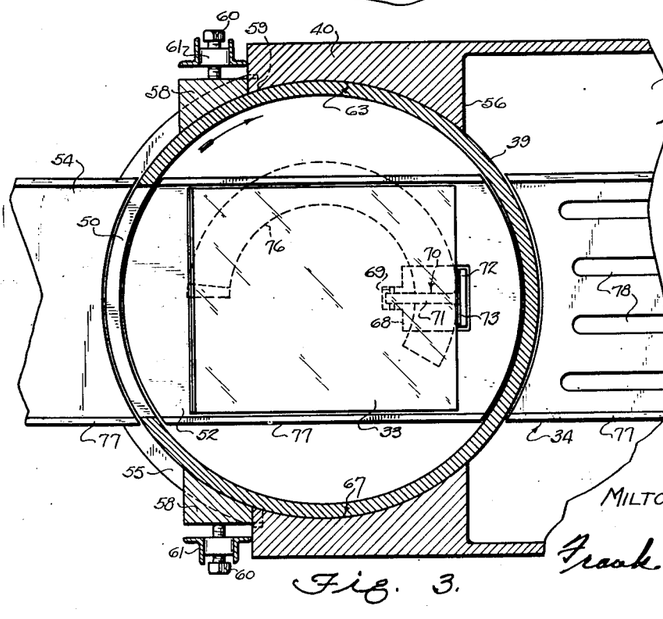
Fig. 3 is a section taken substantially on the line 3—3 in Fig. 2.

As pointed out above, sandwiches to be treated can be introduced into the autoclave A without disturbing the pressure conditions therein by means of the lock B associated with the entrance end of the autoclave. As best shown in Figs. 2 and 3, this lock comprises a cylindrical chamber or drum 39 arranged within a vertical sleeve 40 formed in the outer end and side walls of the compartment 24 adjacent the top thereof.

The chamber 39 is rotatably mounted within the sleeve 40 by means of upwardly extending bosses 41 and 42 formed centrally of the bottom and top walls 43 and 44 respectively of the chamber 39 and provided with central openings therethrough. The boss 41 is adapted to embrace a sleeve 45 threaded onto a stationary pin or shaft 46, which shaft is threaded through the bottom of the sleeve 40 and extends upwardly into the chamber 39. The boss 42 is journaled within a bearing portion 47 formed in the top wall of the compartment 24 and carries adjacent its upper end and keyed thereto a worm wheel 48 adapted to mesh with a worm 49 connected to a suitable source of power for rotating the chamber 39.

The sandwiches 33 pass into and out of the chamber 39 through entrance and discharge openings 50 and 51 respectively in the form of vertically aligned slots cut at converging angles in the side wall thereof. When the chamber 39 is in charging position, as shown in full lines in Fig. 2, the entrance opening 50 will be aligned with the upper end of a stationary slide 52 arranged within the chamber 39 at an angle to the horizontal and fixed to the top of the shaft 46 by means of a boss 53 fitting thereover. The slide 52 is in alignment at all times with a slide 54, arranged exteriorly of the lock B and upon which sandwiches move into the chamber 39, and also with the slide 34 within the autoclave A.

In order to permit sandwiches to be introduced into the lock B and subsequently discharged therefrom into the autoclave A, the sleeve 40 is provided with cut-out portions 55 and 56 communicating with the outside atmosphere and the interior of the compartment 24 respectively. A tight fit is provided between the chamber 39 and the sleeve 40 to prevent the escape of fluid from the autoclave A. As additional precautions, suitable packing glands 57 are provided and also adjustable joints 58 which are slidable in dovetail grooves 59 in the end wall of the compartment 24 and are controllable by suitable jack-screws 60 threaded through a frame 61 exteriorly of the sleeve 40.

A supply of pressing liquid 62 is maintained within the chamber 39 at all times, the level of the liquid being just below the entrance slot 50 and substantially equal to the level of the liquid 21 in the compartment 24 of the autoclave A. With the chamber 39 in charging position (Fig. 2), the slot 50 will be open to permit a sandwich 33 to move by gravity into the chamber from the slide 54 while the slot 51 will be closed by the lower portion of the sleeve 40. After receiving a sandwich, the chamber 39 will be rotated 90 degrees in the direction of the arrow (Fig. 3), which will cause both of the slots 50 and 51 to be closed by the side wall 63 of the sleeve 40. The pressure of the liquid 62 within the chamber 39 may now be built up to substantially that of the liquid 21 in the autoclave A by introducing compressed air into the space 64 above the liquid 62 through a conduit 65 passing through a stationary sleeve 66 in the boss 42 and having suitable connection with an air compressor or the like. When the pressure within the chamber 39 has been built up to the proper point, the chamber is again rotated 90 degrees to place the openings 50 and 51 in communication with the compartment 24 of the autoclave A as shown in broken lines in Fig. 2. At this time the discharge opening 51 is in alignment with the lower end of the slide 52 and the sandwich 33, continuing its movement, will pass from the chamber 39 into the compartment 24.

After discharging the sandwich, the chamber 39 is rotated 90 degrees for the third time to again cause the openings 50 and 51 to be closed, this time by the opposite side wall 67 of the sleeve 40. The compressed air within the space 64 is then exhausted through the conduit 65 so that upon a fourth 90 degree rotation of the chamber, to return it to charging position, it will be in condition to receive the next sandwich to be treated.

Although the speed of rotation of the chamber 39 and the speed of gravitational movement of the sandwich 33 can be so controlled that the chamber will reach discharge position just prior to the movement of the sandwich through the discharge opening 51, it is preferred to provide a positive stop means which will prevent any possibility of the sandwich striking the wall of the chamber 39 before the opening 51 is in alignment with the slide 52.

To this end there is provided, adjacent the lower end of the slide 52, a cut-out portion 68 within which is pivotally mounted as at 69 a latch member 70. The latch member 70 comprises an arm 71 carrying an upturned catch plate 72 faced with rubber, felt or other relatively soft material 73 and a downwardly extending bracket 74 carrying a cam wheel 75. The catch plate 72 is adapted to be positioned within the path of travel of the sandwich 33 over the slide 52, during rotary movement of the chamber 39 from charging to discharging position, by a cam plate 76 carried upon the bottom of the chamber 39 and arranged to slide beneath the wheel 75. The cam plate 76, which is semi-circular in extent and provided with tapered ends 76' is so positioned that, when the chamber 39 is in charging position (Figs. 3 and 4) and during rotary movement thereof from charging to discharging position, the plate 76 will be under the wheel 75. Upon continued movement of the chamber 39 into discharge position, the cam plate 76 will move from under the wheel 75 (Fig. 4) causing the latch member 70 to drop to the broken line position (Fig. 2) and permitting the sandwhich 33 to move through the discharge opening 51 into the compartment 24 of the autoclave A.

From the above, it will be evident that upon proper operation of the lock B, sandwiches to be treated may be introduced therethrough into the autoclave A without affecting the pressure of the liquid in the autoclave. Further, since the chamber 39 is in open communication with the compartment 24 of the autoclave A at regular intervals, the temperature of the liquid within the chamber 39 will be maintained substantially the same as that in the compartment 24 without the use of independent heating means although such means may be provided if desired.

After leaving the lock B, the sandwiches 33 will continue to move by gravity along the slide 34 within the autoclave, being maintained in proper line by side flanges 77 with which all three of the supporting slides 34, 52 and 54 are provided. The slide 34 is also provided with openings 78 (Fig. 3) to equalize the pressure on both sides of the moving sandwiches and prevent any possibility of drag. The speed of movement of the sandwiches 33 through the autoclave A will be so controlled, by the angle of the slide 34, that they will remain within the compartment 24 a sufficient length of time to permit the action of the heated fluid under pressure therein to properly bond the several laminations together, after which the sandwiches will be cooled under pressure for a shorter period of time within the compartment 25 before reaching the lock C.

The construction and operation of the lock C, associated with the discharge end of the autoclave A (Figs. 1 and 5), is similar to that of the lock B just described. Thus, the lock C includes a cylindrical chamber 79 mounted for rotary movement within a vertical sleeve 80 and provided with entrance and discharge slots 81 and 82 respectively. The top of the chamber 79 is provided at its center with a bolt 83 threaded therethrough and having a reduced portion 84 journaled within a sleeve 85 in the top of the sleeve 80.

Figure 5:
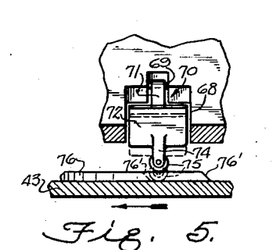
Fig. 5 is a section taken substantially on the line 5—5 in Fig. 2.

The bottom of the chamber 79 is formed with a central, downwardly extending shaft 86 journaled within a bearing portion 87 in the bottom wall of the compartment 25 and having keyed thereto, adjacent its lower end, a worm wheel 88 meshing with a worm 89 adapted to be driven from a suitable source of power to rotate the chamber 79.

Sandwiches 33 will be received within the lock C and will move therethrough upon a stationary slide 90 arranged within the chamber 79 in a manner to align with the slide 34 in the autoclave A and also with a receiving slide 91 positioned outwardly of the lock C. The slide 90 is secured to the upper end of a shaft 92 mounted exteriorly of the autoclave upon a channel iron 93 and extending upwardly through a central bore in the shaft 86 into the interior of the chamber 79. Pivotally mounted within an opening 94 in the slide 90 is a latch member 95 of the same construction as the latch member 70 and operable in the same manner by means of a cam plate 96 carried upon the bottom of the chamber 79.

Figure 4:
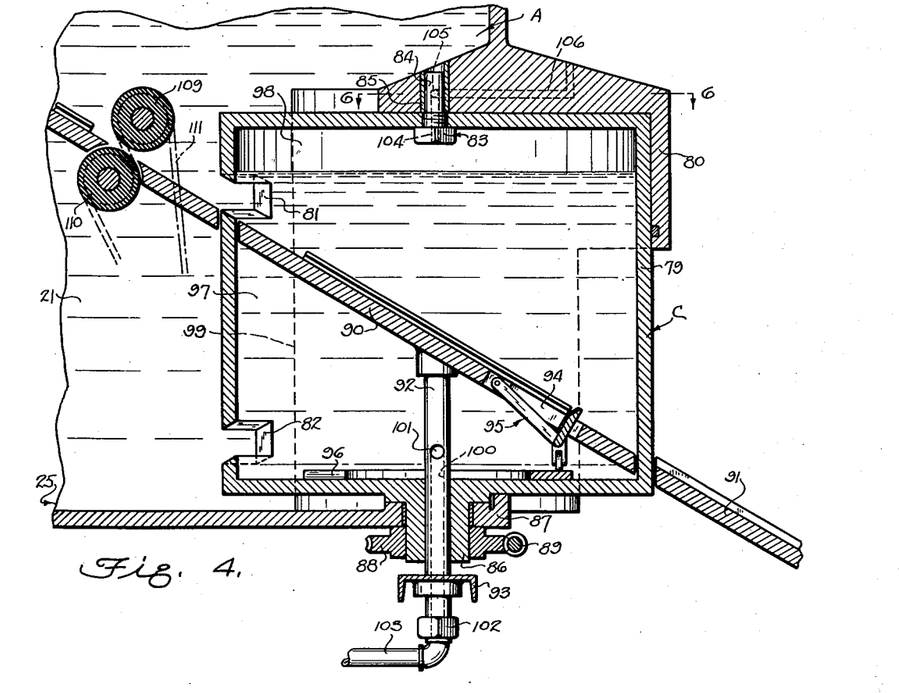
Fig. 4 is a vertical section through the lock associated with the discharge end of the autoclave in Fig. 1.

The chamber 79 contains a supply of pressing liquid 97 and when the lock C is in charging position, as shown in full lines in Fig. 4, the entrance slot 81 of the chamber 79 will be in alignment with the slide 90 and the level of the liquid 97 will be slightly above the slot 81, being maintained at a pressure substantially equal to that of the liquid in the compartment 25 by pressure of the air within the space 98 thereabove. Upon movement of a sandwich 33 into the chamber 79 from the compartment 25, the chamber will be rotated 90 degrees in a clockwise direction to cause the entrance and discharge openings 81 and 82 to be closed by a side wall 99 of the sleeve 80. The level of the liquid 97 must now be lowered to a point slightly below the bottom of the discharge slot 82 and for this purpose the shaft 92 is provided with a central bore 100 terminating in a transverse opening 101 communicating with the interior of the chamber 79. Connected to the lower end of the shaft 92 by fittings 102 is a conduit 103 communicating with a suitable storage tank and pump (not shown) whereby liquid may be pumped into and out of the chamber 79.

Figure 6:
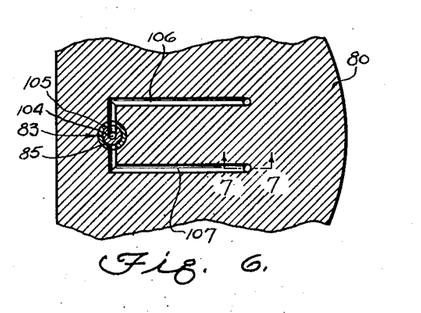
Fig. 6 is a section taken substantially on the line 6—6 in Fig. 4.

In order to prevent the formation of a vacuum in the chamber 79, as liquid 97 is withdrawn therefrom, the bolt 83 is provided with a central bore 104 terminating in a radial opening 105 which at this time is in communication with a passageway 106 in the top of the sleeve 80 (Fig. 6). The passageway 106 is in open communication with the outside atmosphere and permits air to flow into the chamber 79 to replace the liquid 97 as it is withdrawn therefrom.

After the liquid 97 has been lowered to the proper level, the chamber 79 is again rotated 90 degrees in the same direction to bring the discharge opening 82 into alignment with the lower end of the slide 90 and to simultaneously lower the latch member 95 to permit the sandwich 33 to discharge from the lock C. Upon discharge of the sandwich, the chamber 79 will again be given a 90 degree rotation to cause the entrance and discharge openings 81 and 82 to be closed by the opposite side wall of the sleeve 80 at which time liquid 97 will be pumped back into the chamber 79 through the conduit 103 until it reaches a level slightly above the top of the entrance slot 81.

Figure 7:
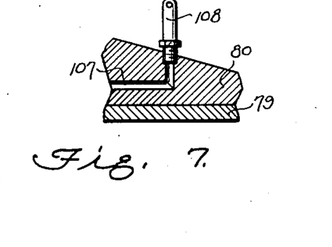
Fig. 7 is a section taken substantially on the line 7—7 in Fig. 6.

With the chamber 79 in this position, the radial opening 105 in the bolt 83 will be in register with a second passageway 107 in the top of the sleeve 80 (Fig. 6). This passageway 107 also communicates with the outside atmosphere but is provided at its outlet end with a safety valve 108 (Fig. 7). The valve 108 will be set at the pressure desired within the chamber 79, which of course will be substantially the same as that in the autoclave A. As fluid 97 is forced into the chamber 79, the valve 108 will prevent the escape of air through the passageway 107 until the pressure within the chamber 79 has been built up to the proper point. Then, as additional fluid is forced in, only sufficient air will be permitted to escape to maintain the desired pressure. When the liquid 97 has been raised to the proper level, the chamber 79 will again be rotated 90 degrees into charging position at which time it will be in condition to receive the next sandwich to be treated.

As indicated above, the speed and intervals of rotation of the chamber 79 in relation to the speed of movement of the sandwiches 33 through the autoclave A can be so controlled that a sandwich will reach the end of the slide 34 just as the chamber 79 is in position to receive it. However, as a safety measure and to permit the maximum number of sandwiches to be treated in a given period, means have been provided to positively and quickly feed the sandwiches from the compartment 25 into the lock C as soon as the chamber 79 reaches charging position. For this purpose, there is interposed in the line of the slide 34, adjacent its lower end, a pair of rolls 109 and 110 of rubber or other resilient material which are adapted to engage a sandwich moving along the slide 34 and to feed it into the chamber 79.

The rolls 109 and 110 are driven only during the time that the chamber 79 is in charging position, by a chain 111 or the like and at a speed considerably faster than the gravitational movement of the sandwiches. With this arrangement, should a sandwich reach the rolls 109 and 110 before the chamber 79 is in position to receive it, the movement of the sandwich will be arrested until the entrance opening 81 comes into alignment with the slide 34, whereupon the rolls will be rotated to feed the sandwich rapidly through the opening and out of the path of the next succeeding sandwich. On the other hand, should a sandwich be late in arriving at the proper position, the rolls 109 and 110 will begin turning as soon as the chamber 79 is in charging position, and when the sandwich does reach the rolls it will be quickly fed through the opening 81 before the next rotary movement of the chamber. If desired, a similar pair of rolls may be arranged adjacent the chamber 39 of the lock B to facilitate the discharge of sandwiches therefrom and into the autoclave A.

Figure 8:
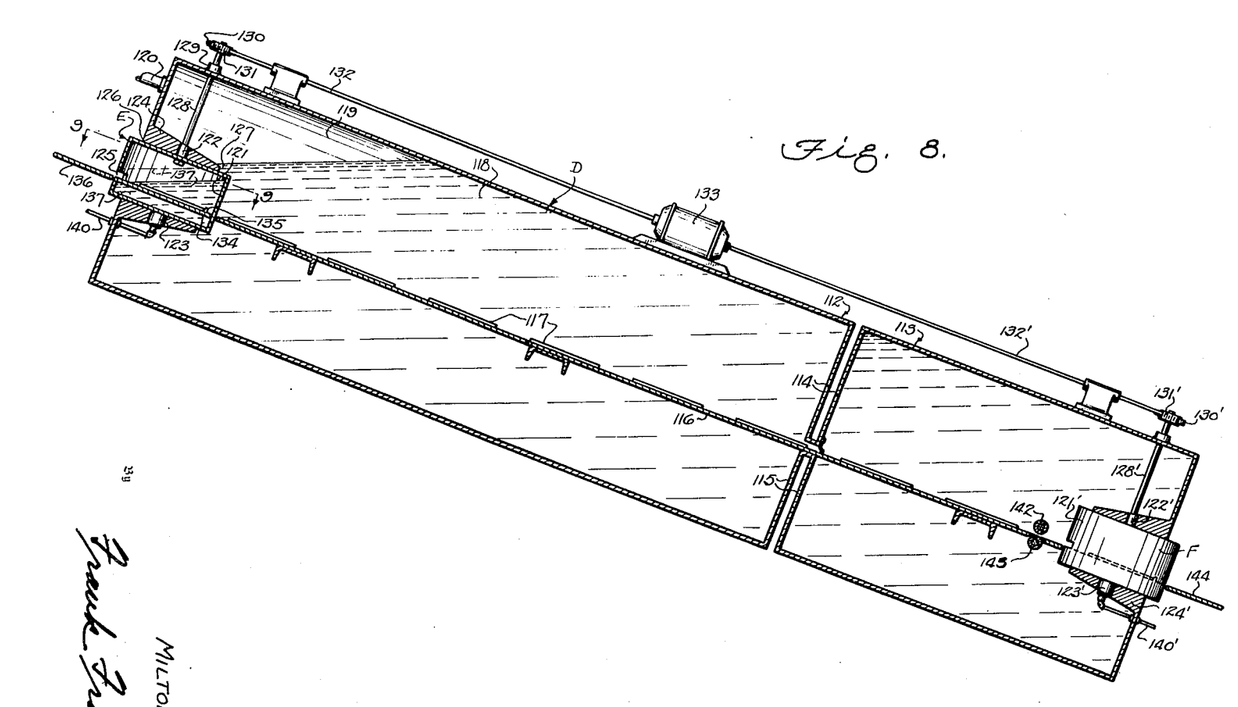
Fig. 8 is a longitudinal, vertical section through a modified form of apparatus.
Figure 9:
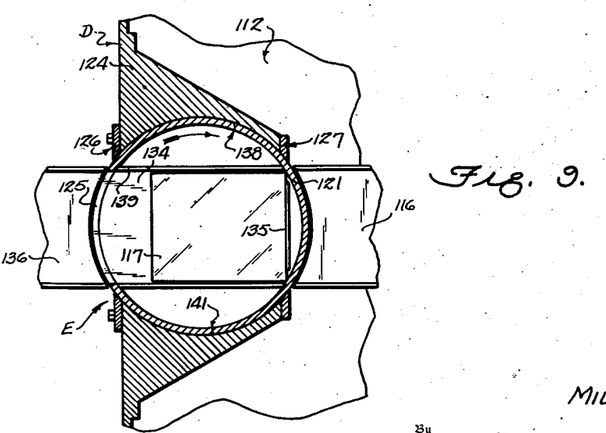
Fig. 9 is a section taken substantially on the line 9—9 in Fig. 8.
Figure 10:
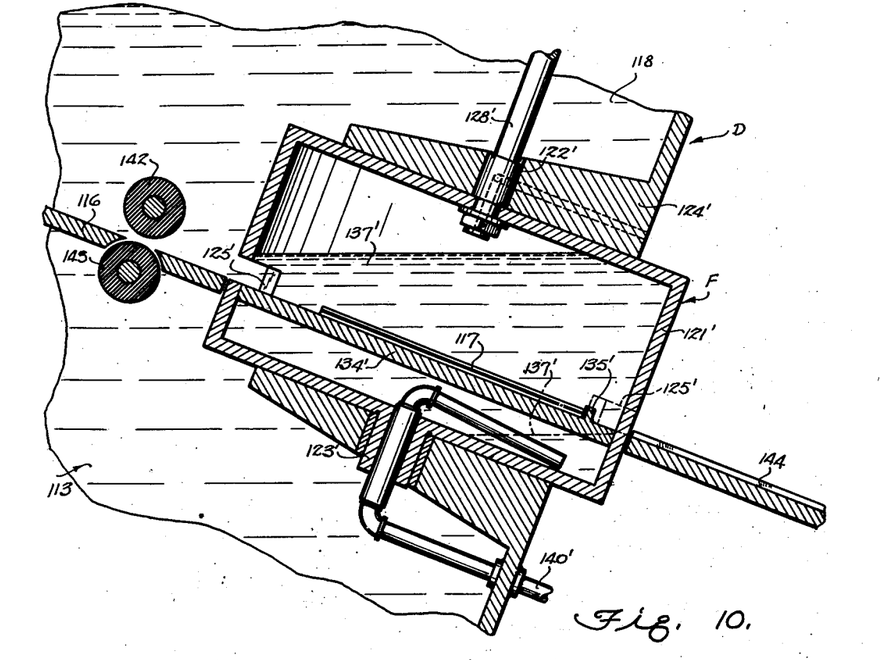
Fig. 10 is a vertical section through the lock associated with the discharge end of the autoclave in Fig. 8.

In Figs. 8, 9 and 10 of the drawings, there has been illustrated a somewhat modified form of apparatus including an autoclave D having locks E and F associated with its entrance and discharge ends respectively. The autoclave D is in the form of an elongated, cylindrical chamber arranged at an angle to the horizontal but similar in construction and operation to the autoclave A (Fig. 1), being divided into communicating compartments 112 and 113 by spaced walls 114 and 115 and provided with a supporting slide 116 upon which sandwiches 117 move by gravity. A supply of pressing liquid 118 is maintained under constant pressure within the autoclave D by means of compressed air introduced into the space 119 above the liquid through a conduit 120.

The two locks E and F, through which sandwiches 117 enter and discharge from the autoclave D, are substantially identical in construction. A detailed description of the lock E will therefore suffice for both and the numerals used when followed by a prime mark will designate corresponding parts of the lock F. The lock E comprises a closed cylindrical chamber or drum 121 provided with stub shafts 122 and 123 and mounted for rotary movement within a sleeve 124 formed in the end wall of the autoclave D.

The axis of rotation of the drum 121 is at right angles to the path of travel of the sandwiches 117, which arrangement permits the sandwiches to move into and out of the lock E through the same opening. Thus, the side wall of the drum 121 of the lock is provided with a single opening or slot 125 and segments of the sleeve 124 are cut off as at 126 and 127 so that, upon proper rotary movement, the drum 121 may be placed in open communication either with the outside atmosphere or the interior of the autoclave D through the opening 125. In order to rotate the drum 121, the stub shaft 122 is provided with a reduced portion 128 extending upwardly through a bearing 129 in the top of the autoclave D and having keyed adjacent its outer end a worm wheel 130. The worm wheel 130 is adapted to mesh with a worm 131 secured to one end of a line shaft 132 driven by a motor 133 mounted upon the autoclave.

The opening 125 is in alignment with a supporting platform 134 mounted within the drum 121 and carried thereby. Formed upon the upper surface of the platform 134 near the end remote from the opening 125 is a stop or bumper strip 135 which acts to limit the movement of sandwiches coming into the lock E and prevents their striking the side wall of the drum 121. With the drum 121 in the position shown in Fig. 8, the opening 125 will also be in alignment with a slide 136 outside of the autoclave and a sandwich placed upon this slide will move by gravity through the opening 125 and onto the platform 134 until it strikes the stop 135.

At this time the level of the pressing liquid 137 in the drum 121 is slightly below the opening 125 as shown in full lines in Fig. 8. The motor 133 is then started to rotate the drum 121 ninety degrees in the direction of the arrow (Fig. 9) and thus cause the opening 125 to be closed by the side wall 138 of the sleeve 124. With the drum in this position, sidewise movement of the sandwich on the platform 134 will be prevented by the side rail 139. Additional liquid is then forced into the drum 121 through a supply conduit 140, communicating therewith through a central opening in the shaft 123, to bring the level of the liquid 137 above the opening 125 and to build up the pressure within the drum to a point substantially equal to that within the autoclave D.

The drum 121 is then rotated another 90 degrees in the same direction to bring the opening 125 into alignment with the slide 116. Now the movement of the sandwich 117 upon the platform 134 will be unobstructed either by the side flanges 139 or the stop 135 so that it is free to move by gravity through the opening 125 and onto the slide 116. When the sandwich 117 has passed completely into the compartment 112 of the autoclave, the drum 121 is rotated 90 degrees a third time to again cause the opening 125 to be closed, this time by the side wall 141 of the drum 121. A portion of the liquid 137 is then withdrawn through the conduit 140 to bring the level down to the full line position of Fig. 8 and to release the pressure thereon after which the drum 121 is again rotated 90 degrees to bring it back to its original or charging position.

The drums 121 and 121' of the locks E and F respectively are rotated simultaneously upon operation of the motor 133 and are so timed that the lock E is in readiness to receive a sandwich to be treated at the same time as the lock F is ready to receive one to be discharged from the autoclave D. In this way the maximum capacity of the autoclave can be utilized and a new sandwich will be introduced therein each time a finished one is discharged.

After a sandwich 117 has passed from the lock E into compartment 112 of the autoclave D, it will continue its gravitational movement upon the slide 116, during which time it will be progressively subjected to the proper temperature and pressure conditions, by action of the liquid 118, until it contacts the rolls 142 and 143 in compartment 113 at the discharge end of the autoclave. The rolls will begin rotating in opposite directions to feed the sandwich rapidly into the lock F as soon as the drum 121' thereof arrives at receiving position (Fig. 10). At this time the level of the liquid 137' in the drum 121' is just above the opening 125' and the pressure within the drum is substantially the same as that within the autoclave D.

After receiving a sandwich from the compartment 113, the drum 121' is rotated through 360 degrees in four successive movements of 90 degrees each. The first 90 degree movement closes the opening 125', whereupon a portion of the liquid 137' is withdrawn through the conduit 140' to lower the level of the liquid to the point shown in broken lines in Fig. 10 and to also reduce the pressure within the drum 121'. The second movement will bring the opening 125' into the broken line position in Fig. 10 and permit the sandwich to move out of the lock F and onto a slide 144 outside of the autoclave. The third movement again closes the opening 125' to permit the proper pressure to be built up in the drum 121' by forcing in additional liquid through the conduit 140', after which the fourth movement will return the drum to loading position with the opening 125' in open communication with the interior of the autoclave D. Suitable air conduits and valves, such as illustrated in Figs. 6 and 7, may be associated with the locks E and F to facilitate the pumping of pressing liquid into and out of the drums 121 and 121'.

The pressure apparatus so far described has been shown as accommodating only a single line of sandwiches moving therethrough. It will be understood, however, that two or more lines of sandwiches may be treated at the same time by the provision of additional supporting slides and platforms arranged one above another within the autoclaves and locks. Another way in which the capacity of pressure apparatus of this character can be increased is by the use of multiple locks associated with each end of the autoclave. A construction of this type has been illustrated diagrammatically in Fig. 11 wherein double locks G and H have been shown associated with the discharge end of an autoclave I. The locks G and H are adapted to align with a similar pair of locks associated with the entrance end of the autoclave I (not shown) to permit two lines of sandwiches to be moved through the autoclave at the same time.

Figure 11:
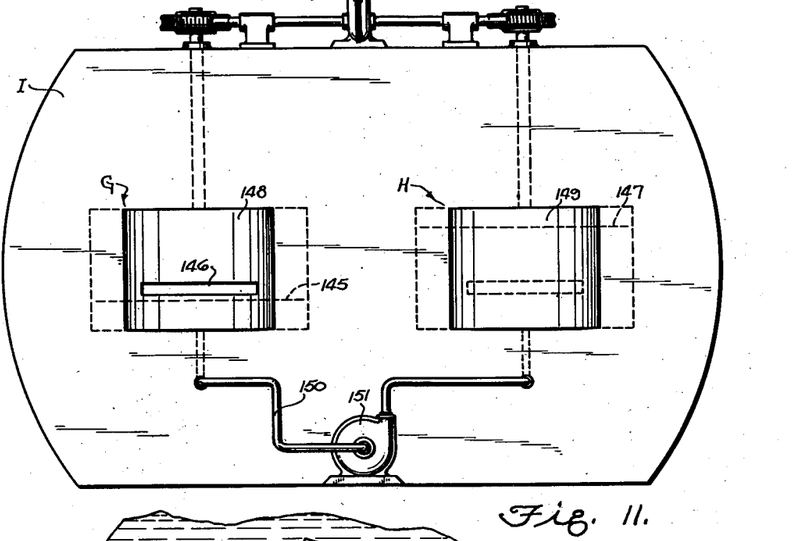
Fig. 11 is an end view of a modified form of apparatus.

This arrangement also makes possible a more efficient handling of the pressure liquid within the locks. Thus, the lock G is in position to discharge a sandwich and the liquid 145 therein is below the opening 146 and at atmospheric pressure when the lock H is in position to receive a sandwich and the liquid 147 therein is at a high level and under elevated pressure. Before the drum 148 of the lock G can be brought into receiving position and the drum 149 of the lock H brought into discharging position, additional liquid must be forced into the lock G and some of the liquid 147 must be removed from the lock H. This can be readily accomplished by transferring liquid from the lock H to the lock G through a conduit 150 by means of a pump 151 interposed in the line thereof. Relatively little energy will be required to operate the pump 151 due to the fact that the pressure upon the liquid 147 will tend to force it from the lock H to the lock G until the pressure between the two is equalized. Before returning the drums 148 and 149 to their original positions, liquid can be transferred from the lock G to the lock H by simply reversing the process.

Figure 12:
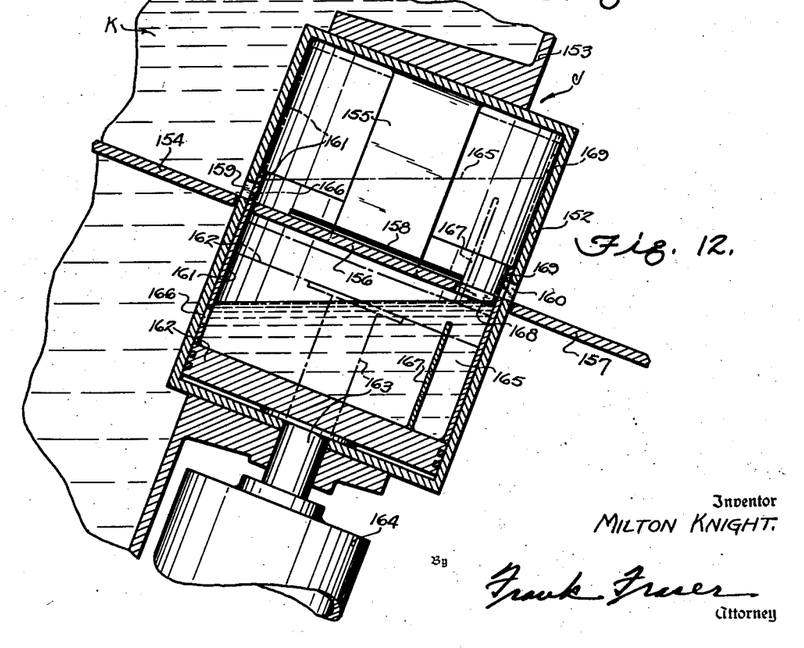
Fig. 12 is a vertical section through a modified form of lock.

In Fig. 12 there is illustrated a modified form of lock designated in its entirety by the letter J and shown as associated with the discharge end of an autoclave K. The lock J comprises a closed cylinder or drum 152 mounted within the end wall 153 of the autoclave K and at right angles to a slide 154 arranged within the autoclave and adapted to support glass-plastic sandwiches for movement therethrough by gravity. Suspended from the roof of the cylinder 152 by means of a bracket 155 is a supporting platform 156 in alignment with the slide 154 and also with a similar slide 157 outside of the autoclave K. Sandwiches 158 move into the lock J from the autoclave K through a slotted opening 159 in the side wall of the cylinder 152 and subsequently discharge through a second, oppositely disposed opening 160. The openings 159 and 160 are adapted to be successively opened and closed by an internal sleeve 161 fixed to the top of a piston 162 which is mounted for reciprocation within the cylinder 152 by means of a piston rod 163 operable from an air or hydraulic cylinder 164. In addition to closing the openings 159 and 160, the movement of the piston 162 will also raise and lower the level of the liquid 165 within the lock J and will build up or release the pressure on said liquid.

In operation, with the piston 162 in the broken line position of Fig. 12, the lock J is ready to receive a sandwich from the autoclave K. At this time the piston 162 is just below the platform 156 and a port 166 in the sleeve 161 is in registry with the entrance opening 159 in the cylinder 152. The level of the liquid 165 is just above the opening 159 and the pressure on the liquid is substantially equal to that on the liquid in the autoclave K. A sandwich in position to discharge from the autoclave can now move by gravity through the opening 159 and along the platform 156 until it strikes a stop 167 fixed to the top of the piston 162 and projecting upwardly through an opening 168 in the platform 156.

When the sandwich has been received within the lock J, the piston 162 is moved downwardly to cause the sleeve 161 to close the opening 159 and to also lower the level of the liquid 165 and reduce the pressure thereon. When the piston is in its lowermost position (full lines in Fig. 12), a port 169 in the sleeve 161 will be in registry with the discharge opening 160 in the cylinder 152. The pressure on the liquid 165 will be exhausted and the level of the liquid will be below the opening 160. The stop 167 will be below the platform 156 and the sandwich 158 will be free to move out of the lock J and onto the slide 157. After discharge of the sandwich, the piston 162 can again be raised to prepare the lock J for recharging.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising an apertured cylindrical chamber, closure means for said chamber engaging the walls thereof, means for causing relative movement between the chamber and closure means to open and close said chamber, means for building up fluid pressure within the chamber, and means arranged within said autoclave and said locks and at an angle to the horizontal for supporting the sandwiches and causing them to move by gravity therethrough.

2. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising a slotted chamber, a sleeve provided with cut-out portions and engaging the walls of said chamber, means for causing relative movement between the chamber and sleeve to open and close said chamber, means for building up fluid pressure within said chamber and for subsequently releasing said pressure, and means arranged within said autoclave and said locks and at an angle to the horizontal for supporting the sandwiches and causing them to move by gravity therethrough.

3. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising an apertured chamber, closure means for said chamber engaging the walls thereof, means for causing relative movement between the chamber and closure means to open and close said chamber, means for building up fluid pressure within the chamber, means arranged within the autoclave and the locks and at an angle to the horizontal for supporting the sandwiches and causing them to move by gravity therethrough, and means within said locks for temporarily interrupting the movement of said sandwiches.

4. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising an apertured chamber, closure means for said chamber engaging the walls thereof, means for causing relative movement between the chamber and closure means to open and close said chamber, means for building up fluid pressure within the chamber, means arranged within the autoclave and the locks and at an angle to the horizontal for supporting the sandwiches and causing them to move by gravity therethrough, means within said locks for temporarily interrupting the movement of said sandwiches, and means within said autoclave for interrupting and subsequently accelerating the movement of the sandwiches therethrough.

5. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising an apertured chamber, closure means for said chamber engaging the walls thereof, means for causing relative movement between the chamber and closure means to open and close said chamber, means for building up fluid pressure within the chamber, means arranged within the autoclave and the locks and at an angle to the horizontal for supporting the sandwiches and causing them to move by gravity therethrough, and means within said locks and operable by the relative movement between said chamber and closure means for temporarily interrupting the movement of the sandwiches.

6. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising a substantally vertically arranged drum having an entrance and a discharge opening in substantially vertical alignment in one wall thereof, closure means for said openings engaging the walls of said drum, means for causing rotary movement of said drum to open and close said openings, means for building up fluid pressure within the drum, and stationary means arranged within said autoclave and said locks and at an angle to the horizontal for supporting the sandwiches for movement therethrough.

7. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising a cylindrical chamber having an entrance and discharge opening in one wall thereof, closure means for said opening engaging the walls of said chamber, means for rotating the chamber to open and close said opening, means for building up fluid pressure within said chamber, and means arranged within the chamber and movable therewith for supporting the sandwiches for movement therethrough.

8. In apparatus for use in the compositing of laminated safety glass, an autoclave containing fluid under pressure, locks associated with the entrance and discharge ends of said autoclave and through which sandwiches to be treated may be passed into and subsequently discharged from the autoclave without materially affecting the pressure of the fluid therein, at least one of said locks comprising a chamber containing a fluid and having an entrance and a discharge opening in opposite walls thereof, a piston operable within said chamber, a sleeve carried by said piston in engagement with the walls of the chamber and provided with cut-out portions, means for reciprocating said piston to cause the piston to build up and subsequently release the pressure of the fluid within the chamber and to cause the sleeve to open and close the openings in the walls thereof, and means arranged within said autoclave and said locks for supporting the sandwiches for movement therethrough.

9. In a pressure apparatus, an autoclave containing fluid under pressure, locks associated with the entrance and discharge ends of said autoclave and in longitudinal alignment therewith through which articles to be treated may be passed into and subsequently discharged from the autoclave without materially affecting the pressure of the fluid therein, at least one of said locks comprising an apertured chamber, closure means for said chamber engaging the walls thereof, means for causing relative movement between the chamber and closure means to open and close said chamber, and means arranged within said autoclave and said locks and at an angle to the horizontal for supporting the articles and causing them to move by gravity in a straight line therethrough.

MILTON KNIGHT.